United States Patent [19]

Planty

[11] Patent Number: 4,485,583

[45] Date of Patent: Dec. 4, 1984

[54] FLEA-VACUUM

[76] Inventor: Audrey Planty, P.O. Box No. 2785, La Jolla, Calif. 92038

[21] Appl. No.: 401,618

[22] Filed: Jul. 26, 1982

[51] Int. Cl.$^3$ .............................................. A01M 1/06
[52] U.S. Cl. .................................... 43/139; 15/327 R; 15/352; 15/402
[58] Field of Search ................ 43/139, 140, 143, 113, 43/132.1; 15/327 R, 402, 352, 314, 350

[56] References Cited

U.S. PATENT DOCUMENTS

| | | | |
|---|---|---|---|
| 1,083,087 | 12/1913 | Griffiths | 15/402 |
| 1,308,685 | 7/1919 | Di Salvio | 15/314 |
| 1,859,132 | 5/1932 | Fechtenburg | 15/402 |
| 3,616,622 | 11/1971 | Friedman | 15/327 R |
| 3,667,084 | 6/1972 | Valbona | 15/350 |
| 3,668,736 | 6/1972 | Loscalzo | 15/402 |
| 3,750,327 | 8/1973 | Thybault | 15/402 |
| 3,797,066 | 3/1974 | Zaidan | 15/402 |
| 4,074,458 | 2/1978 | Catlett | 43/139 |
| 4,175,352 | 11/1979 | Catlett | 43/139 |
| 4,279,095 | 7/1981 | Aasen | 43/139 |

FOREIGN PATENT DOCUMENTS 1409937  7/1965  France .................... 15/350

Primary Examiner—Gene P. Crosby

[57] ABSTRACT

A hand held self-contained vacuum which is equipped with interchangeable detachable combs. Within the handle of the Aspirator is a disposable paper container for the entrapment and disposal of fleas. The Aspirator being attached to a small portable electric motor by a six-foot-long plastic hose. The motor being powered by plugging into any household electrical power outlet. The Aspirator is worked across the coat of a dog or cat, with or without the combs attached, and suctions fleas into the paper container inside the handle of the Aspirator. The fleas trapped inside can then be removed and disposed of through a small trap door on the top of the aspirator handle.

3 Claims, 12 Drawing Figures

FLEA-VACUUM

CROSS REFERENCES

U.S. Pat. No. 3,750,327—August 1973—Thybault . . . 43/139

U.S. Pat. No. 4,074,458—February 1978—Catlett . . . 43/139

U.S. Pat. No. 4,279,095—July 1981—Aason . . . 43/139

BRIEF SUMMARY OF THE INVENTION

The primary object of this invention is to provide a more efficient method for the removal and disposal of fleas from household pets.

Devices for the removal of fleas by the use of attachments to household vacuum cleaners have been provided heretofore. This invention is completely self-sufficient and does not rely on any other device. It has its own power supply and is used quite independently.

This invention also eliminates the use of poisonous pesticides and insecticides which are both dangerous and undesirable. The fleas are suctioned into a disposable paper container within the aspirator. The paper container then seals itself when the suction power is turned off and the container can be removed from the aspirator and easily disposed of.

A further object of this invention to provide a variety of combs which are interchangeable and attach to the mouth of the aspirator. These combs are designed to provide more efficient removal of fleas from a variety of different animals. The teeth on said combs will vary in distance from each other, and in length. The comb used for a long haired cat will have finer and longer teeth than the one used on a short haired dog.

It is another object of this invention to provide a small trap door in the handle of the aspirator which opens to allow for the removal of the container with trapped fleas inside, and for the placement of a new container ready for the next use.

A further advantage which this invention offers is that it is easily transported by hand and can be used anywhere there is an electrical outlet. Rechargeable batteries will also be available so that the motor can be operated, even when no electrical power is available.

Other objects, features and advantage of this invention will be apparent from the following detailed description, appended claims, and the accompanying drawings.

DETAILED DESCRIPTION

Figure 1:
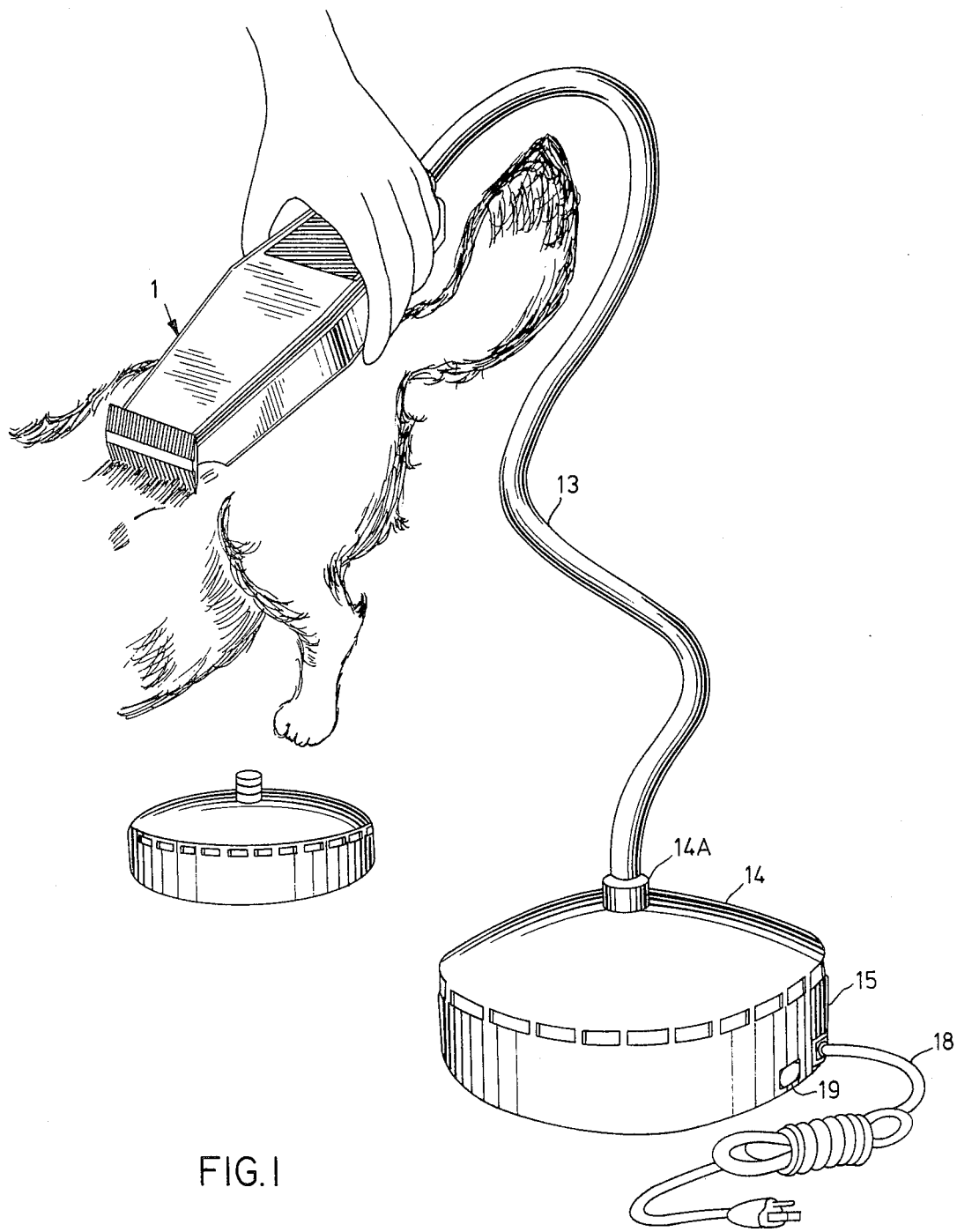
FIG. 1. Depicts a general assembly view of the vacuum/flea remover/disposer.
Figure 2:
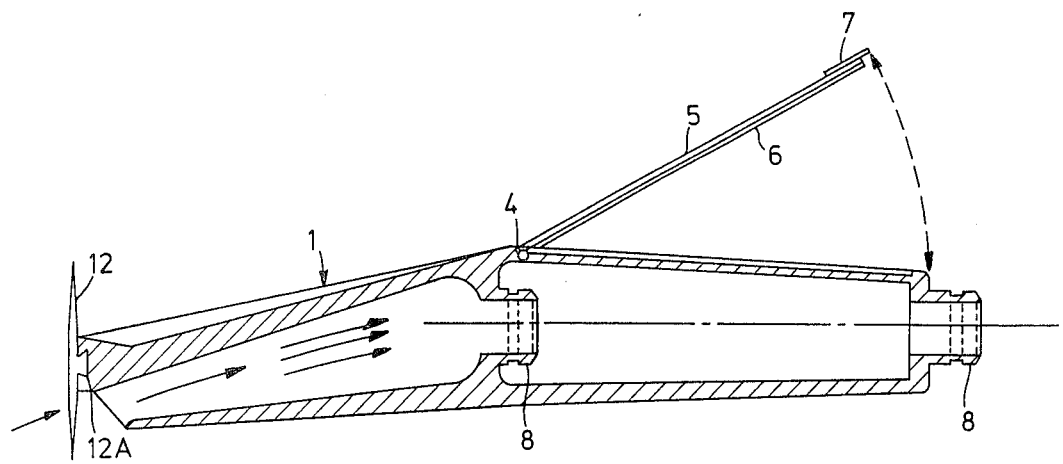
FIG. 2. Depicts a cross-sectional view of the aspirator assembly with comb attachment. (For clarity of drawing, shown without flea-trap retainer (20).
Figure 3:
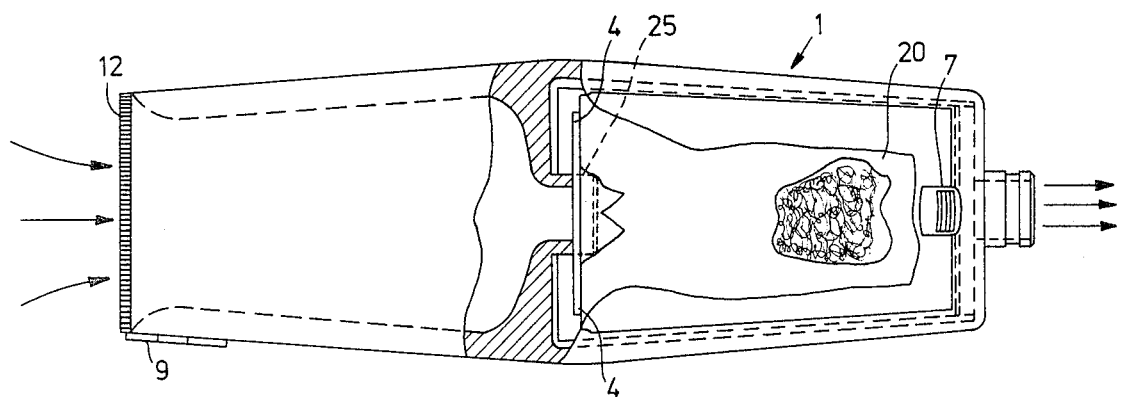
FIG. 3. Depicts a top view of the aspirator assembly with partial sectional view to show interior components.
Figure 4:
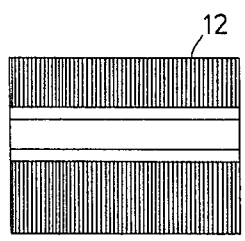
FIGS. 4 and 4a. Depicts front and side views of the comb attachment.
Figure 4A:
Figure 5:
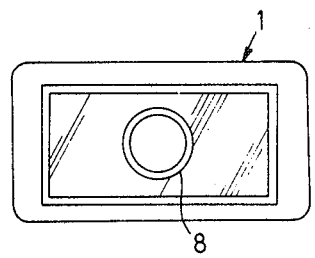
FIG. 5. Depicts a rear-end view of the aspirator body with quick-disconnect hose fitting.
Figure 6:
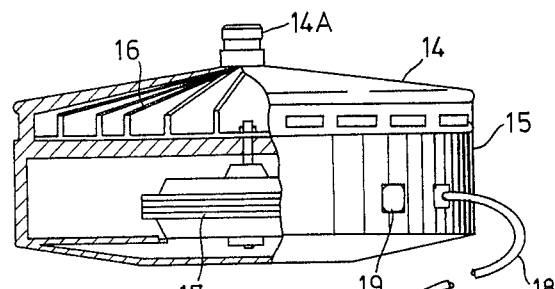
FIG. 6. Depicts a vacuum generator assembly with partial sectional view to show interior components.
Figure 7A:
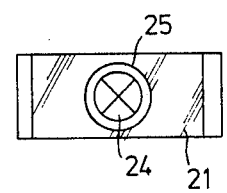
FIGS. 7. 7A & 7B. Depicts top, front and side views of the flea-trap/retainer assembly.
Figure 7B:
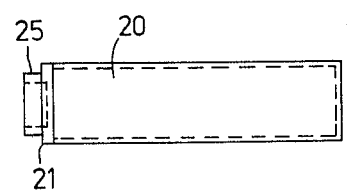
Figure 7:
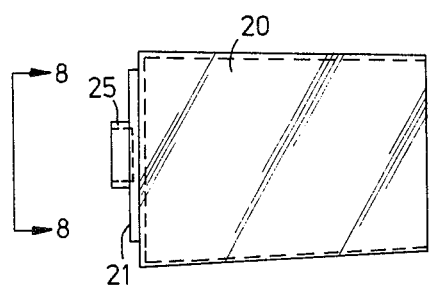
Figure 8:
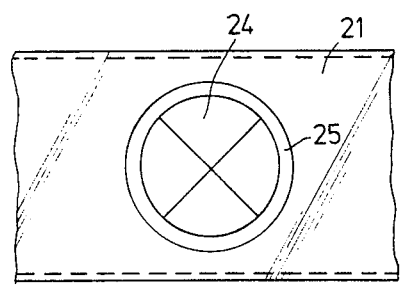
FIGS. 8 & 8A. Depicts front and cross-sectional view of the flea-trap/retainer components.
Figure 8A:
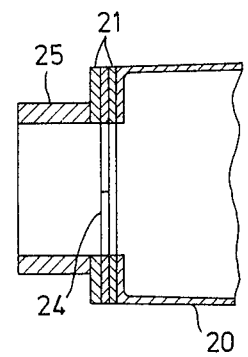

The aspirator (1) consists of a cast Polycarbonate plastic body possessing very tough, unbreakable properties. In addition the unit is small in size ($1\frac{1}{2}'' \times 2\frac{1}{2}'' \times 6\frac{1}{2}''$) and easily hand-held. The aspirator (1) is pulled along the sides of the animal's body in a front-down position. In conjunction with the COMB (12), the animal's hair is raked with short or long stroking motions. The comb (12) consists of a cast Polycarbonate structure, it is composed of two sets of different length of teeth, is connected to the aspirator (1) at the point of air intake through matching grooves (12A) and held into locked position by any known or conventional sliding latch (9).

As the animal's fur is combed, the eggs, larvae, fleas and loose hairs are dislodged from the hair and skin, by the fine and loose held line of teeth of the comb (12). Subsequently all of this matter is picked up by the fast moving air flow, ingested through the air intake of the aspirator (1) and deposited into the disposable flea-trap-retainer (20) bag. At the end of the combing operation, the bag may be removed and appropriately disposed of with its contents trapped inside.

The intake opening of the flea-trap-retainer (20) is provided with a Neoprene seal (25). This seal is mounted into a hardboard base (21) and is constructed with a center opening consisting of four triangular shaped flaps (24). The seal is inserted over the quick-disconnect fitting (8). The fast moving air flow causes the flaps to bend inwards, thus establishing a doorway to the inside of the trap. For the duration that the negative pressure is maintained and therefore the airflow sustained, the flaps (24) remain open, and whatever foreign substance is aspirated into the trap is securely held against the insides, by the air flow. When power is eventually turned off, the resilient nature of the seal (25) causes the flaps (24) to return to their original position effectively sealing the trap.

The flea-trap-container (20) bag is contained in a compartment provided inside the aspirator (1). Access to this compartment is provided through a door (5). This door (5) is hinged to the aspirator (1) by two hinge pins (4). A Polyurethane seal (6) is attached to the outside perimeter of the compartment opening, and provides an effective air-tight closure of said compartment. An effective air flow originating only from the intake of the aspirator (1) is thus achieved. The door (5) is held in locked position by any known or conventional latch (7).

The aspirator (1) has as an integral part of its body two quick-disconnect type fittings (8) for both the insertion/attachment of the flea-trap-retainer (20) bag, and the air hose (13) attachment. The HOSE (13) consists of a 1" diameter standard plastic hose with spiral steel wire reinforcement. It is connected to the quick-disconnect fitting (8) on the rear of the aspirator (1), and the intake port (14A) of the vacuum generator (14). The vacuum generator (14) consists of a Polycarbonate plastic casing (15) with a cenrifugal impeller (16) to create the negative pressure. The required electro-mechanical motion is provided by a $\frac{3}{8}$ Horse power electrical MOTOR (17). The motor (17) in conjunction with the centrifugal impeller (16) is able to produce a negative pressure of six to eight inches on a water scale. Power is provided, through a standard 120 VAC cord (18), by insertion of same into an average household outlet. The switch (19) provides power off/on capability.

An identical but optional vacuum generator (20) unit with rechargeable batteries in addition to direct plug-in, is also available.

I claim:
1. A self-contained vacuum device for the removal and disposal of fleas from household pets, comprising;
   a. a hand held aspirator forming a handle having an open suction area at one end,
   b. a vacuum generator powered by a ⅜ horsepower electrical motor attached to the aspirator by a plastic hose constructed with spiral steel wire reinforcement,
   C. said aspirator having a compartment inside the handle for inserting and removing a retainer bag, said retainer bag having a flap-type flea trap attached thereto for preventing fleas from escaping from the retainer bag,
   d. said compartment in the aspirator handle being provided with hinge-pins, a door connected to said hinge-pins for opening and closing said compartment, and a latch to secure said door when closed,
   e. said vacuum generator being provided with an on/off switch for the control of electrical power,
   f. the aspirator being further provided with a quick-disconnect type fitting inside the handle for the insertion/detachment of said flea-trap retainer bag,
   g. said open suction area of said one end of said aspirator being provided with a sliding latch for the purpose of securing in place a comb retained in said one end of said aspirator.

2. A self contained vacuum device as defined in claim 1,
   a. said combs having teeth on both sides and the teeth on one side of the comb will vary in the distance between said teeth and also in the length of said teeth, from the second side of the comb,
   b. said comb being attached over the suction area of the aspirator and retained by said sliding latch.

3. A self-contained vacuum device as defined in claim 1,
   a. said retainer bag being a paper container to be installed into the compartment in the handle of the aspirator,
   b. said paper container is provided with a neoprene seal at one end which is constructed with a center opening and mounted on a hardboard base,
   c. said neoprene seal consists of four triangular shaped flaps which bend inward with the fast intake of air, thus establishing a doorway to the inside of the container into which fleas are suctioned and when the negative pressure is turned off the resilient nature of the seal causes said flaps to return to their original position,
   d. said retainer bag is secured inside the compartment in the aspirator handle by a quick-disconnect insertion/removal fitting.

* * * * *